United States Patent
Musal

(10) Patent No.: US 6,449,776 B1
(45) Date of Patent: Sep. 17, 2002

(54) REMOVABLE MOUNTING BRACKET FOR EXPANDED PLASTIC FOAM ARTICLES

(75) Inventor: Michael J. Musal, Soquel, CA (US)

(73) Assignee: Bell Sports, Inc., Santa Cruz, CA (US)

( * ) Notice: Subject to any disclaimer, the term of this patent is extended or adjusted under 35 U.S.C. 154(b) by 0 days.

(21) Appl. No.: 09/784,860

(22) Filed: Feb. 15, 2001

(51) Int. Cl.[7] .............................. A42B 1/22
(52) U.S. Cl. ............... 2/418; 2/421; 2/425; 411/447; 411/913
(58) Field of Search ............ 2/425, 421, 422, 2/411, 418; 411/913, 508, 447, 456, 451.3; 248/71

(56) References Cited

U.S. PATENT DOCUMENTS

| | | | |
|---|---|---|---|
| 2,329,471 A | * | 9/1943 | King |
| 2,909,957 A | * | 10/1959 | Rapata |
| 3,471,866 A | * | 10/1969 | Raney |
| 3,908,235 A | * | 9/1975 | Telliard et al. |
| 4,051,555 A | * | 10/1977 | Daly |
| 5,049,018 A | * | 9/1991 | Murphy |
| 5,083,321 A | * | 1/1992 | Davidsson |
| 5,308,205 A | * | 5/1994 | Lautenschlager |
| 5,774,901 A | * | 7/1998 | Minami |

FOREIGN PATENT DOCUMENTS

JP 5-132809 * 5/1993

* cited by examiner

Primary Examiner—Rodney M. Lindsey
(74) Attorney, Agent, or Firm—Robert O. Guillot; Intellectual Property Law Offices

(57) ABSTRACT

The mounting bracket of the present invention includes an integrally molded head portion and article attachment portion that are formed of a flexible plastic material. The head portion is shaped for insertion into a cavity that is molded into an EPS article of manufacture such as a bicycle helmet. The flexible plastic head portion expands upon insertion into the cavity, such that it engages sidewall portions of the cavity and resists pulling forces that tend to remove it from the cavity. In the preferred embodiment, the head portion is generally shaped like a ladder, having two side rails and a plurality of rung members disposed therebetween. The cavity formed within the EPS foam is shaped to receive the head portion in a collapsed configuration. After the collapsed head portion is inserted within the cavity, it expands such that the outer surfaces of the side rails are pressed against sidewall surfaces of the cavity.

20 Claims, 2 Drawing Sheets

REMOVABLE MOUNTING BRACKET FOR EXPANDED PLASTIC FOAM ARTICLES

BACKGROUND OF THE INVENTION

1. Field of the Invention

The present invention relates generally to mounting devices for the attachment of objects to expanded plastic foam articles of manufacture, and more particularly to a removable mounting bracket for engaging helmet fitting straps to expanded polystyrene (EPS) bicycle helmets.

2. Description of the Prior Art

The attachment of various articles, such as straps, to expanded plastic foam articles of manufacture, such as expanded polystyrene (EPS) bicycle helmets, has been accomplished in several ways. Openings can be molded into the EPS article such that straps or other objects can be looped through the openings and affixed thereto. Other types of engagement methods have included the placement of an anchor piece within an EPS mold for an article followed by the injection of EPS foam into the mold and the subsequent removal of the article from the mold, such that the anchor piece is molded in the hardened EPS article. Still other types of engagement methods have included the use of Velcro where one portion of the mating Velcro pieces is glued to the EPS article.

Each of these prior art methods has its drawbacks. Looped straps can be too loose fitting; molded in anchors can become difficult to orient in a repeatable manner during manufacture and adhesively bonded attachment devices such as Velcro can become detached where the adhesive fails.

The present invention solves these problems by providing a releasable anchor that is inserted within a cavity that is molded into the EPS article. As will be understood from the following disclosure, the anchor is easily inserted into the cavity and expands following insertion to resist pulling forces that act to remove it. It therefore provides a simple, strong yet releasable anchor for various articles such as a head fit strap for a bicycle helmet.

SUMMARY OF THE INVENTION

The mounting bracket of the present invention includes an integrally molded head portion and article attachment portion that are formed of a flexible plastic material. The head portion is shaped for insertion into a cavity that is molded into an EPS article of manufacture such as a bicycle helmet. The flexible plastic head portion expands upon insertion into the cavity, such that it engages sidewall portions of the cavity and resists pulling forces that tend to remove it from the cavity.

In the preferred embodiment, the head portion is generally shaped like a ladder, having two side rails and a plurality of rung members disposed therebetween. The cavity formed within the EPS foam is shaped to receive the head portion in a collapsed configuration. After the collapsed head portion is inserted within the cavity, it expands such that the outer surfaces of the side rails are pressed against sidewall surfaces of the cavity. A pulling force on one of the side rails tends to force the two side rails apart, increasing the lateral force of the side rails against the cavity walls, thus enhancing the engagement of the head within the cavity. An outwardly depending pull tab may be integrally formed with the other side rail to facilitate the release of the head from the cavity.

A bicycle helmet of the present invention includes the shaped cavity together with the mounting bracket that is formed for mating insertion within the cavity.

It is an advantage of the present invention that a mounting bracket is provided for the releasable attachment of an object with an EPS article of manufacture.

It is another advantage of the present invention that a mounting bracket is provided for the attachment of an object to an EPS article of manufacture wherein the mounting bracket is an integrally molded device.

It is a further advantage of the present invention that a mounting bracket is provided in which an increased pulling force generates an increased resistive force against the removal of the mounting bracket.

It is yet another advantage of the present invention that a reliable mounting bracket is provided that comprises a single integrally molded piece.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
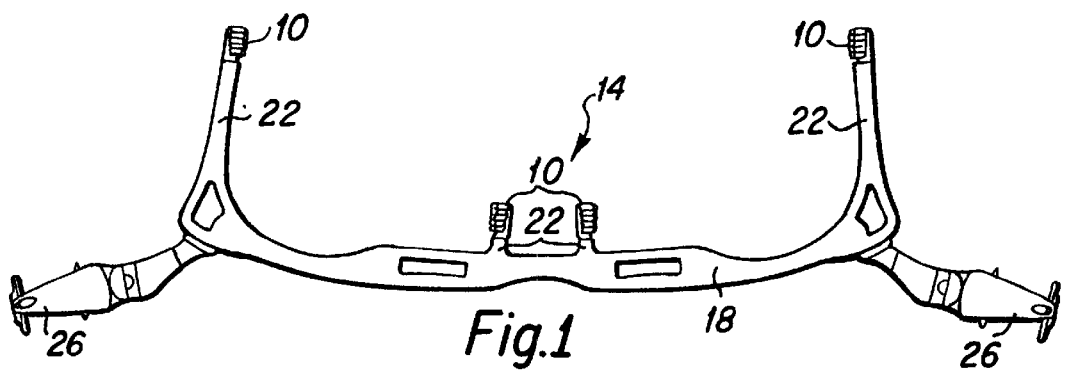
FIG. 1 is a plan view of a bicycle helmet fit strap of the present invention including four EPS anchors of the present invention.

The anchor device of the present invention is designed to provide a secure yet releasable engagement of an object with an expanded plastic foam article of manufacture. A particular application of the present invention is the utilization of the anchor to attach a fit-strap to the inner portions of an expanded polystyrene (EPS) bicycle helmet, and FIG. 1 is a plan view of such a bicycle helmet fit-strap 14 which includes four anchors 10 of the present invention. As depicted in FIG. 1, the fit-strap 14 is comprised of a particularly shaped band of material, such as cloth or plastic, having a head engagement band portion 18 for engagement with a wearer's head, and helmet engagement band portions 22 to which the attachment anchors 10 of the present invention are engaged, and which serve to attach the fit-strap 14 to interior portions of an EPS helmet (not shown). Matingly engagable end portions 26 of the strap 14 are provided for engagement together, such that the fit-strap 14 forms a band around the wearer's head. Fit-straps are generally well known in the art, and the fit-strap of the present invention is unique in that it includes the anchors 10 of the present invention for releasable engagement with a bicycle helmet, as is described herebelow.

Figure 2:
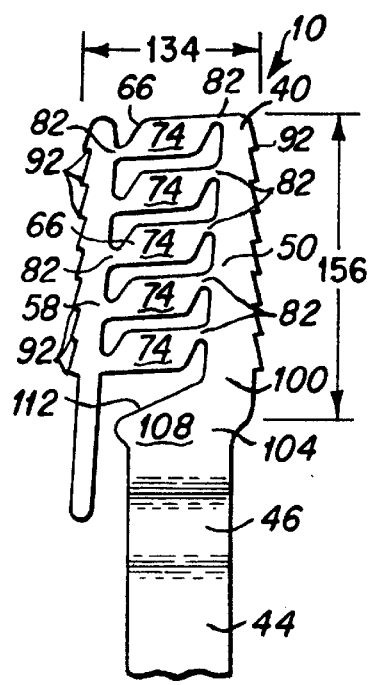
FIG. 2 is a front elevational view of an anchor of the present invention.
Figure 3:
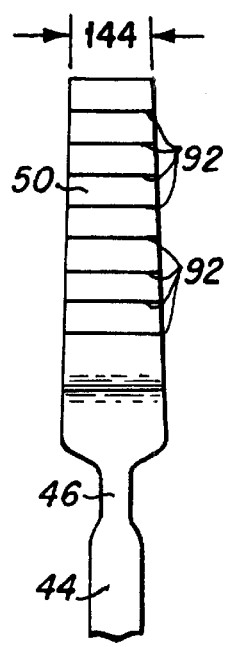
FIG. 3 is a side elevational view of the anchor depicted in FIG. 2.

FIG. 2 is a front elevational view of a preferred embodiment of an anchor 10 of the present invention, and FIG. 3 is a side elevational view of the anchor 10 depicted in FIG. 2.

Figure 4:
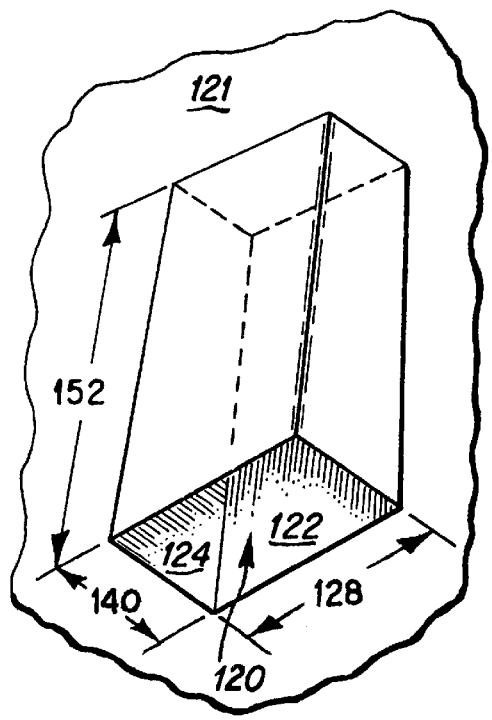
FIG. 4 is a perspective view depicting an anchor cavity of the present invention formed within an EPS article of manufacture such as a bicycle helmet.

As depicted in FIGS. 2 and 3, the anchor 10 generally includes an anchor head portion 40 and an article attachment end portion 44. The anchor head 40 is preferably integrally formed with the attachment end 44, such that the anchor 10 is preferably formed as a single integrally molded piece and is composed of a flexible plastic material. The article attachment end portion 44 is depicted as a thin elongated end portion that projects from the head portion 40 and may be integrally molded with the engagement bands 22 of the fit strap 14; however, the attachment end 44 may take many forms and shapes as are generally required for the attachment of the anchor 10 to an object, such as the fit-strap depicted in FIG. 1. In the attachment strap depicted in FIGS. 1 and 2, a thin flexible section 46 may be formed proximate the head 40 to provide further flexibility to the attachment strap 44 and facilitate the insertion of the head 40 into an anchor cavity 120 as is depicted in FIG. 4 and described in detail herebelow. However, where the anchor 10 is utilized to attach objects other than the fit-strap 14 of FIG. 1, the attachment end 44 may be formed in various shapes and sizes as are required to engage such objects.

The head 40 may be generally thought of as having a ladder shaped structure including a first side rail 50, a second side rail 58 and a plurality of rungs 66 integrally formed between the side rails 50 and 58. Each of the rungs 66 is formed with a wide, central body portion 74 and narrow end portions 82 formed at the juncture of the rung body portion 74 with the side rails 50 and 58. The outer edges of the side rails 50 and 58 are preferably formed with a series of downwardly projecting serrations or teeth 92 which serve to aid in the engagement of the anchor 10 within a foam plastic article of manufacture such as an EPS bicycle helmet, as is described more fully herebelow. The first side rail 50 is preferably formed with a relatively wide base portion 100 that supports the engagement of the anchor head 40 with the attachment end 44 to provide a strong, reliable engagement of the head portion 40 with the attachment end 44, where pulling forces are applied to the attachment end 44 during usage of the anchor 10. The upper portion 104 of the attachment end 44 may be formed with an enlarged heel portion 108 that includes a flat angled surface 112. The functional purpose of the heel portion 108 is described hereinbelow with the aid of FIG. 5.

As indicated hereabove, the anchor 10 is designed for releasable engagement with an expanded plastic foam article of manufacture such as an EPS bicycle helmet, and without limiting the general application of the present invention, the following discussion refers to a bicycle helmet as the article of manufacture. To accomplish the releasable engagement of the anchor 10 to the EPS bicycle helmet, a shaped cavity 120, as depicted in FIG. 4, is formed in the EPS helmet 121 at the desired attachment location of the anchor 10. The cavity 120 is formed with two sidewalls 122 and two endwalls 124, such that the cavity 120 has a generally rectangular cross-section. The sidewalls 122 have a length 128 that generally corresponds to the width 134 of the anchor head 40 depicted in FIG. 2, the endwalls 124 have a width 140 that generally corresponds to the thickness 144 of the anchor head 40 as depicted in FIG. 3, and the cavity 120 has a depth 152 that generally corresponds to the height 156 of the anchor head 140, such that the anchor head 40 is insertable within the cavity 120. To accomplish the releasable engagement of the anchor 10 within the cavity 120 the dimensions and tolerances of the anchor head 10 and the cavity 120 require further discussions, as is next provided with the aid of FIGS. 5 and 6.

Figures 5, 6:
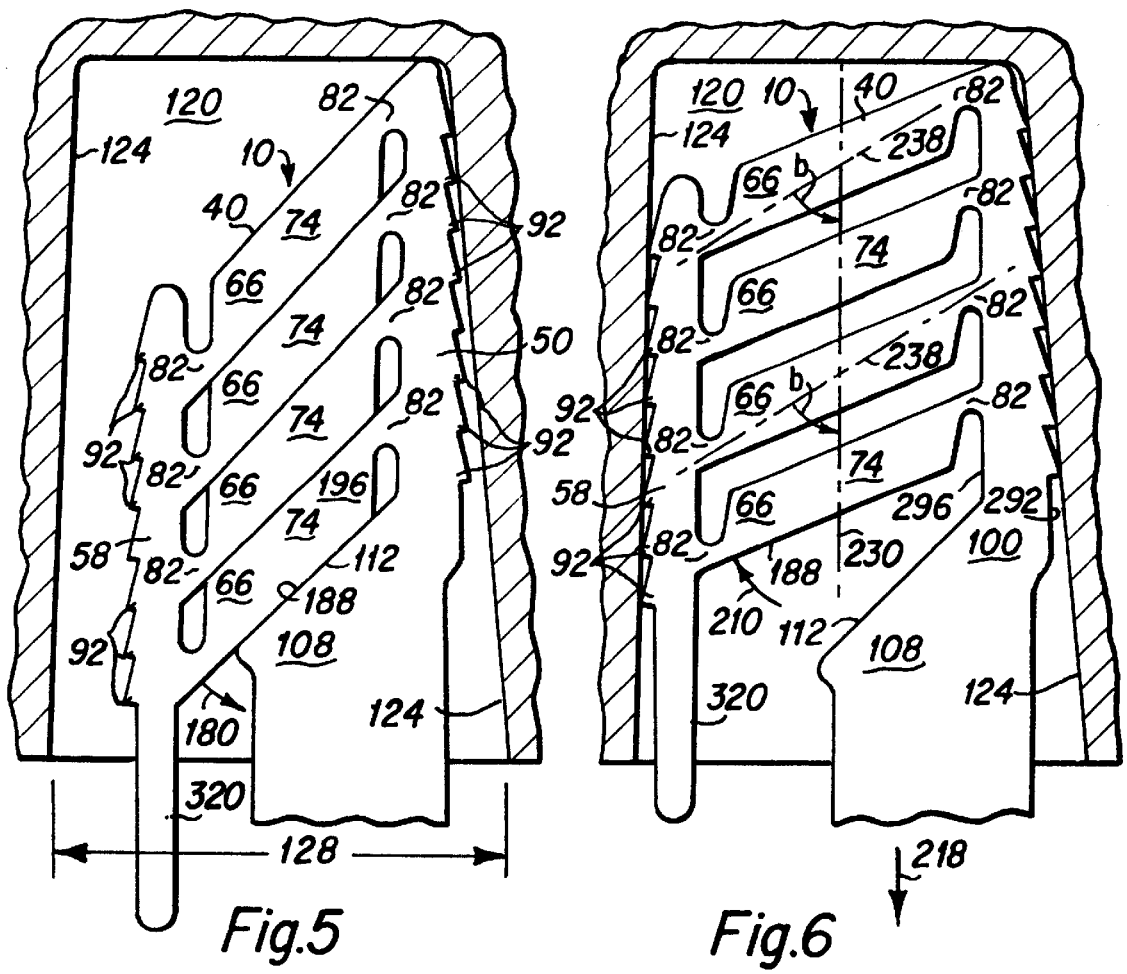
FIG. 5 is a front elevational view depicting a collapsed configuration of the anchor of FIG. 2 inserted within the cavity of FIG. 4.
FIG. 6 is a front elevational view depicting the anchor engaged within the cavity of FIG. 4.

FIG. 5 is a front elevational view of the anchor 10 depicted in a collapsed configuration and inserted within the cavity 120, and FIG. 6 is an elevational view of the anchor engaged within the cavity 120. The collapsed configuration of the anchor head 40 as depicted in FIG. 5 is best understood by comparison with the head configuration depicted in FIG. 2. Specifically, owing to the flexible plastic material from which the anchor 10 is molded and the relatively thin rung end portions 82, the second side rail 58 may be rotated downwardly (see arrow 180) relative to the first side rail 50. The downward rotation 180 may be accomplished until the lower edge 188 of the thickened rung portion 74 of the lowest rung 196 makes contact with the upper surface 112 of the heel portion 108 of the anchor 10. Owing to the generally parallelogram-like configuration of the ladder-like head design, each of the thicker central portions 74 of the rungs 66 are likewise collapsed into contact against each other when the head 40 is in its fully collapsed configuration as depicted in FIG. 5. It can be seen in FIG. 5 that the length 128 of the cavity 120 is greater than the width of the collapsed head depicted in FIG. 5, such that the teeth 92 of the side rails 50 and 58 do not simultaneously contact both endwalls 124 of the cavity 120.

FIG. 6 depicts the anchor head 40 in engagement within the cavity 120. As depicted therein, the second side rail 58 has rotated upwardly (see arrow 210) such that the teeth 92 of side rail 50 as well as teeth 92 of side rail 58 simultaneously make contact with the endwalls 124 of the cavity 120. In the preferred embodiment, the resilient nature of the flexible plastic of the anchor 10 naturally results in the upward rotation 210 of the second side rail 58, where the anchor 10 is molded in the open configuration depicted in FIG. 2. As will now be obvious to those skilled in the art, when a downward force 218 is applied to the attachment end 44 of the anchor 10, the anchor head will become even more tightly engaged within the cavity 120. This is because a downward motion of the attachment end 44 will cause a corresponding downward motion of the first side rail 50 owing to the integrally formed nature of the head. However, any downward motion of the first side rail 50 will create a lateral, outward force between the first side rail 50 and the second side rail 58 owing to the angular orientation of the rungs 66 between the side rails and the engagement of the teeth 92 of side rail 58 with the endwall 124 of the cavity. More specifically, the head 40 has a vertical central axis 230 and each rung 66 can be thought of as having a longitudinal central axis 238 that exists between the two narrow ends 82 of each rung 66, such that an angle b is formed between the central head axis 230 and the rung axis 238 of each rung 66. It will therefore be appreciated by those skilled in the art that general downward movement of the first side rail 50 relative to the second side rail 58 will cause angle b to increase and create a corresponding lateral outward movement of side rails 58 and 50 relative to each other until angle b could be approximately as much as 90°. Therefore, the dimensions of the cavity 120 and the anchor head 40 can conceivably be selected such that the engagement of the two side rails 50 and 58 with the endwalls 124 of the cavity 120 may occur anywhere from an angle b of about 90° down to a relatively steep angle b such as 25° (where the head is in a fully collapsed configuration). Significantly, however, as will be understood by those skilled in the art, a relatively weak head engagement within the cavity will occur where angle b is at its extreme of approaching 90° and at its minimum of approaching 25°, whereas a relatively strong engagement of the anchor head within the cavity 120 will occur where angle b is in a generally mid-range of approximately 35° to approximately 55° with a preferred angle of approximately 45°. Where angle b is less than approximately 35°, the anchor head 40 tends to pull out of the cavity 120 too easily and without significant opening of angle b, and where angle b is greater than approximately 60°, the anchor head 40 may be pulled out of the cavity 120 too easily because the lateral force generated between the two side rails 50 and 58 against the endwalls 124 of the cavity 120 does not increase sufficiently as the side rails 50 and 58 separate. Of course, these angles and angle ranges apply to the head embodiment depicted in FIGS. 1–3, 5 and 6, and may not apply to other head rail/rung configurations that may be developed by those skilled in the art.

A significant feature of the present invention is that the side rails 50 and 58 apply a uniform outward force throughout the depth of the cavity endwalls 124. That is, as is best seen in FIG. 6, each of the rungs 66 is disposed at a substantially identical angle relative to the central axis of the head 40, and each rung 66 therefore applies an equal outward force between the side rails 50 and 58 at each rung location when a downward force 218 is applied to the attachment end 44. Thus, the general parallelogram nature of the ladder configuration of the head 40 results in equal lateral force being applied throughout the length of each side rail 50 and 58 against the interior endwalls 124 of the cavity 120, whereby a superior engagement of the head 40 within the cavity 120 is accomplished with the head configuration of the present invention.

It is typical though not necessary in forming molded cavities, such as cavity 120 that the sidewalls 122 and endwalls 124 are not exactly parallel, but rather are formed with a small angular draft, such that a mold cavity creating insert can be removed from the cavity 120 upon the opening of the mold, and such a cavity wall draft is typically on the order of 1° to 3° from the central axis of the cavity. To accomplish the generally uniform lateral force of the side rails 50 and 58 against cavity endwalls 124 having a draft angle such as 1° to 3°, the head 40 is preferably constructed such that the serrated outer edges of the side rails 50 and 58 diverge from the central axis 230 at a corresponding angle of 1° to 3°. Alternatively, the head can be constructed such that the first side rail 50 is tapered from its top region 280 to its base region 100 such that the right side rail's outer edge 292 diverges from the right side rail's inner edge 296 at an angle which is twice the draft angle, or approximately 2° to 6° where the draft angle of the cavity is 1° to 3°. In these configurations, the teethed outer edges of the side rails will be parallel to the corresponding endwalls 124 of the cavity 120 as the head 40 expands (arrow 210) within the cavity 120. Uniform contact of the teeth 92 of the side rails 50 and 58 with the cavity endwalls 124 will occur when the head expansion occurs, as has been discussed hereabove.

It is to be noted that the thickened central portions 74 of the rungs 66 serves an important purpose of inhibiting a twisting collapse of the rungs 66 where a significant downward force 218 acts to pull the head 40 from the cavity 120. That is, if the rungs 66 were as thin as end portions 82 throughout the length of each rung 66, then a significant pulling force 218 could cause such thin rungs to bend or twist throughout their length, such that the lateral outward force of the side rails 50 and 58 against the cavity endwalls 124 could suddenly decrease, with a result that the head 40 would be pulled from the cavity 120. The thickened central portions 74 of the rungs 66 act to prevent such bending and twisting of the rungs, and thereby serve to provide strength to the anchor head 40. Where it is desired to provide an easily removable anchor, an anchor releasing pull tab 320 may be formed at the lower end of side rail 58. Where the anchor head 40 is engaged within a cavity 120, as depicted in FIG. 6, a downward force applied to the pull tab 320 will cause the head 40 to rotate towards the collapsed configuration depicted in FIG. 5. When the head 40 is in the more collapsed configuration, the side rail 58 becomes released from the cavity endwall 124, and the head 40 can thereupon be easily removed from the cavity 120.

It will be understood by those skilled in the art that certain alterations and modifications of the anchor head 40 may be made without departing from the true spirit and scope of the present invention. A particularly significant feature of the present invention is the collapsible/expandable ladder-like configuration of the side rails and rungs of the head. This configuration provides a uniform outward force between the side rails as the head expands within the cavity. This results in a uniform engagement force of the anchor head side rails against the cavity side walls and thereby provide a strong engagement of the anchor head within the cavity. While a preferred rung shape, and preferred side rail shapes have been depicted herein, the present invention is not to be so limited. That is, other rung shapes and side rail shapes that nevertheless include the generalized ladder-like configuration of the head will become obvious to those skilled in the art upon reading this disclosure, and are deemed to be within the scope of the present invention and the claims that follow.

What is claimed is:

1. A mounting bracket for engaging objects to expanded plastic foam (EPS) articles of manufacture, comprising:
   an integrally molded head portion and object attachment portion, said head portion including:
   a first side rail;
   a second side rail;
   a plurality of rung members being disposed between said first side rail and said second side rail; said rung members including a generally thick central portion and generally thin end portions, each said end portion being integrally molded with one of said side rails.

2. A mounting bracket as described in claim 1 wherein said mounting bracket is comprised of a flexible plastic material.

3. A mounting bracket as described in claim 1 wherein said first and second side rails include outer side edges having serrated surfaces.

4. A mounting bracket as described in claim 3 wherein said outer edge of said first side rail and said second side rail converge at an angle of approximately 6°.

5. A mounting bracket as described in claim 1 wherein said first rail and said second rail include inner side edges that are generally parallel to each other.

6. A mounting bracket as described in claim 1 wherein said attachment portion includes an upper enlarged heel portion and a lower article attachment end.

7. A mounting bracket as described in claim 1 wherein said first side rail includes a base portion and a tip portion, and wherein said base portion is wider than said tip portion.

8. A mounting bracket as described in claim 1 wherein a mounting release member is integrally formed with said second side rail.

9. A bicycle helmet comprising:
   an expanded plastic foam portion having at least one article attachment cavity formed therein, said attachment cavity including two opposed sidewalls and two opposed endwalls;
   a strap member having at least one mounting bracket engaged therewith, said mounting bracket being formed for mating engagement within said cavity;
   said mounting bracket including:

an integrally molded head portion and object attachment portion, said head portion including:
   a first side rail;
   a second side rail;
   a plurality of rung members being disposed between said first side rail and said second side rail; said rung members including a generally thick central portion and generally thin end portions, each said end portion being integrally molded with one of said side rails.

10. A bicycle, helmet as described in claim 9 wherein said mounting bracket is comprised of a flexible plastic material.

11. A bicycle helmet as described in claim 9 wherein said first and second side rails include outer side edges having serrated surfaces for enhanced frictional engagement with said opposed endwalls of said cavity.

12. A bicycle helmet as described in claim 11 wherein said outer edges of said first side rail and said second side rail converge at an angle of approximately 6°.

13. A bicycle helmet as described in claim 12 wherein said cavity endwalls converge at an angle of approximately 6°.

14. A bicycle helmet as described in claim 9 wherein said first rail and said second rail include inner side edges that are generally parallel to each other.

15. A bicycle helmet as described in claim 9 wherein said attachment portion includes an upper enlarged heel portion and a lower article attachment end.

16. A bicycle helmet as described in claim 9 wherein said first side rail includes a base portion and a tip portion, and wherein said base portion is wider than said tip portion.

17. A method for mounting objects to an expanded plastic foam article of manufacture comprising the steps of:

forming an expanded plastic foam article of manufacture such that an article engagement cavity is formed therein, said article engagement cavity including two opposed sidewalls and two opposed endwalls;

forming an integrally molded article mounting bracket, said mounting bracket including:
     an integrally molded head portion and object attachment portion, said head portion including:
       a first side rail having an outer side edge thereof;
       a second side rail having an outer side edge thereof;
       a plurality of rung members being disposed between said first side rail and said second side rail; said rung members including a generally thick central portion and generally thin end portions, each said end portion being integrally molded with one of said side rails.

inserting said mounting bracket into said cavity such that said outer side edges of said side rails make contact with said opposed endwalls of said cavity;

said mounting bracket having a central axis thereof and said side rails having a longitudinal axis thereof and wherein an angle between said central axis and said longitudinal axis is between 35° and 55° when said mounting bracket is inserted within said cavity.

18. A method as described in claim 17 wherein said angle is approximately 45°.

19. A method as described in claim 17 wherein said cavity endwalls are formed with a draft angle of approximately 3°, and said outer edges of said side rails converge with an included angle of approximately 6°.

20. A method as described in claim 17 wherein said mounting bracket is comprised of a flexible plastic material.

\* \* \* \* \*